United States Patent
Tabassi

(10) Patent No.: US 7,048,532 B2
(45) Date of Patent: May 23, 2006

(54) STROKE LIMITER FOR VALVE PIN ACTUATING MECHANISM

(75) Inventor: Payman Akhavan Tabassi, Etobicoke (CA)

(73) Assignee: Mold-Masters Limited (CA)

( * ) Notice: Subject to any disclaimer, the term of this patent is extended or adjusted under 35 U.S.C. 154(b) by 267 days.

(21) Appl. No.: 10/725,031

(22) Filed: Dec. 2, 2003

(65) Prior Publication Data

US 2004/0109914 A1    Jun. 10, 2004

Related U.S. Application Data

(60) Provisional application No. 60/430,050, filed on Dec. 2, 2002.

(51) Int. Cl.
*B29C 45/23*   (2006.01)

(52) U.S. Cl. .................................................. 425/564

(58) Field of Classification Search ............... 425/562, 425/563, 564, 565, 566; 264/328.9
See application file for complete search history.

(56) References Cited

U.S. PATENT DOCUMENTS

| | | |
|---|---|---|
| 3,488,810 A | 1/1970 | Gellert |
| 3,806,295 A | 4/1974 | Gellert |
| 3,912,133 A | 10/1975 | Hehl |
| 3,915,358 A | 10/1975 | Hehl |
| 4,013,393 A | 3/1977 | Gellert |
| 4,026,518 A | 5/1977 | Gellert |
| 4,053,271 A | 10/1977 | Gellert |
| 4,222,733 A | 9/1980 | Gellert |
| 4,272,236 A | 6/1981 | Rees |
| 4,286,941 A | 9/1981 | Gellert |
| 4,712,995 A | 12/1987 | Basnet |
| 4,793,795 A | 12/1988 | Schmidt |
| 4,810,184 A | 3/1989 | Gellert |
| 4,917,593 A | 4/1990 | Gellert |
| 4,917,594 A | 4/1990 | Gellert |
| 4,919,606 A | 4/1990 | Gellert |
| 5,067,893 A | 11/1991 | Osuna-Diaz |
| 5,387,099 A | 2/1995 | Gellert |

(Continued)

FOREIGN PATENT DOCUMENTS

DE    32 37 924 A1    4/1984

(Continued)

OTHER PUBLICATIONS

Heat-Lock Needle-Valve Sprue Bushing Type A, Heatlock Catalog 2000.

*Primary Examiner*—Tim Heitbrink
(74) *Attorney, Agent, or Firm*—Sterne, Kessler, Goldstein & Fox P.L.L.C.

(57) ABSTRACT

A valve pin actuating mechanism for an injection molding apparatus is provided. The injection molding apparatus includes at least one melt channel and a valve pin that is movable in the melt channel. The valve pin actuating mechanism includes an actuator, a linkage element and a stop. The linkage element has a mechanically upstream connector and a mechanically downstream connector. The linkage element is connected at least indirectly to the actuator at the mechanically upstream connector and is connected at least indirectly to the valve pin at the mechanically downstream connector. The linkage element is rotatable by actuation of the actuator. The stop is configured to engage a limit surface to limit the angle of rotation of the linkage element. The stop and the limit surface are configured to engage mechanically upstream from the downstream connector of the linkage element.

27 Claims, 10 Drawing Sheets

U.S. PATENT DOCUMENTS

| | | |
|---|---|---|
| 5,902,614 A | 5/1999 | Kuntz |
| 5,916,605 A | 6/1999 | Swenson |
| 5,942,257 A | 8/1999 | Gellert |
| 5,948,450 A | 9/1999 | Swenson |
| 5,984,661 A | 11/1999 | Vorkoper |
| 6,086,357 A | 7/2000 | Steil |
| 6,893,249 B1 | 5/2005 | Babin |
| 2003/0057607 A1* | 3/2003 | Babin .................. 425/564 |

FOREIGN PATENT DOCUMENTS

| | | |
|---|---|---|
| DE | 32 37 923 C2 | 8/1986 |
| EP | 0 282 999 A2 | 9/1988 |
| EP | 0 836 925 A1 | 4/1998 |
| EP | 0 832 729 B1 | 3/2000 |
| EP | 1 291 148 A1 | 3/2003 |
| GB | 1 306 697 | 2/1973 |
| WO | WO 96/27489 | 9/1996 |

* cited by examiner

STROKE LIMITER FOR VALVE PIN ACTUATING MECHANISM

FIELD OF THE INVENTION

The invention relates to an injection molding apparatus, and more particularly to a laterally actuated valve pin gating mechanism for an injection molding apparatus.

BACKGROUND OF THE INVENTION

In many injection molding apparatuses, a valve pin is used to open and close a gate into a mold cavity in order to control the melt flow into the mold cavity. Depending on the layout constraints in the injection molding apparatus, it can be desirable to provide an actuating mechanism for the valve pin, that extends laterally to the valve pin.

The technical literature shows several hot runner injection nozzle designs having a valve pin actuating mechanism incorporating a rocker arm or a linkage that extends laterally either to engage the valve pin directly, or to engage a guide element, which retains the valve pin. In some configurations the rocker arm engages the valve pin or the guide element opposing jaws, (eg. upper and lower jaws) that capture the valve pin or the guide element. The rocker arm is connected at its rear end to an actuator, such as a pneumatic cylinder, which controls the movement of the rocker arm, and in turn, the movement direction of movement of the valve pin.

During use of such mechanisms however, it can occur that the mechanisms wear or fail where the jaws engage the valve pin or the guide element. There is a continuing need for an improved, laterally actuated valve gating mechanism.

SUMMARY OF THE INVENTION

In a first aspect, the invention is directed to a valve pin actuating mechanism for an injection molding apparatus. The injection molding apparatus includes at least one melt channel and a valve pin that is movable in the melt channel. The valve pin actuating mechanism includes an actuator, a linkage element and a stop. The linkage element has a mechanically upstream connector and a mechanically downstream connector. The linkage element is connected at least indirectly to the actuator at the mechanically upstream connector and is connected at least indirectly to the valve pin at the mechanically downstream connector. The linkage element is rotatable by actuation of the actuator. The stop is configured to engage a limit surface to limit the angle of rotation of the linkage element. The stop and the limit surface are configured to engage mechanically upstream from the downstream connector of the linkage element.

In a second aspect, the invention is directed to a valve pin actuating mechanism for an injection molding apparatus. The injection molding apparatus includes at least one melt channel and a valve pin that is movable in the melt channel. The valve pin actuating mechanism includes an actuator, a valve pin guiding element, a linkage element and a stop. The valve pin guiding element is for connection to the valve pin and for guiding the valve pin a line of travel. The valve pin guiding element has first and second generally opposed receiving surfaces, which are substantially perpendicular to the line of travel of the valve pin. The linkage element has a mechanically upstream connector and a mechanically downstream connector. At the mechanically downstream connector the linkage element has first and second arms for engaging the first and second receiving surfaces. Rotation of the linkage element causes movement of the valve pin along the line of travel. The actuator is mechanically upstream of the linkage element and is connected at least indirectly to the mechanically upstream connector of the linkage element for rotating the linkage element. The stop is configured to engage a limit surface to limit the angle of rotation of the linkage element. The stop and the limit surface are configured to engage mechanically upstream from the first and second arms.

DESCRIPTION OF THE DRAWINGS

For a better understanding of the present invention and to show more clearly how it may be carried into effect, reference will now be made by way of example to the accompanying drawings, in which:

FIG. 9 is a side view of the valve pin actuating mechanism shown in FIG. 2, having an alternative stop, shown in an enlarged view in FIG. 9a.

DESCRIPTION OF THE PREFERRED EMBODIMENTS

Figure 1:
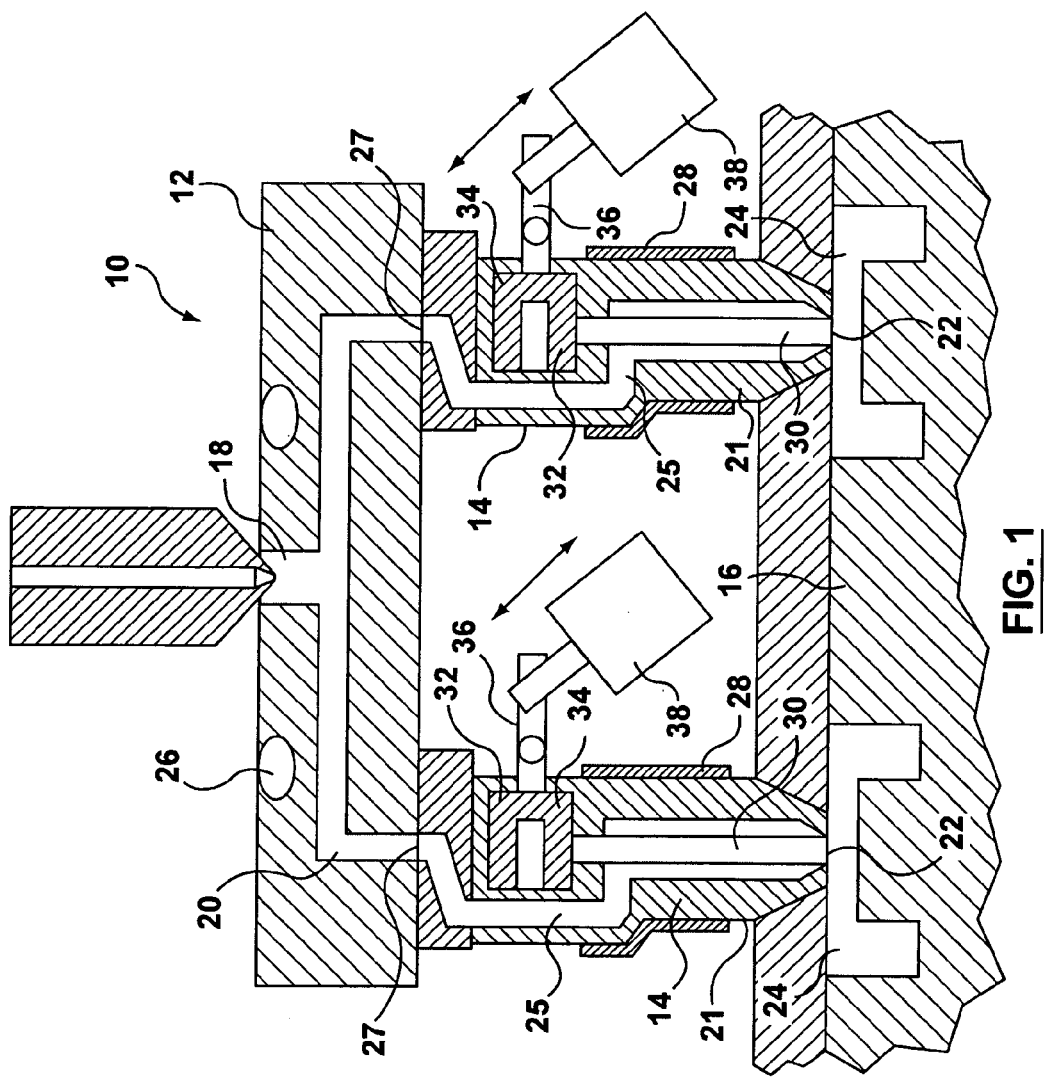
FIG. 1 is a sectional elevation view of an injection molding apparatus having a plurality of valve pin actuating mechanisms in accordance with a first embodiment of the present invention.

Reference is made to FIG. 1, which shows an injection molding apparatus in accordance with the present invention, shown generally at 10. As an example embodiment, injection molding apparatus 10 may have a manifold 12, a plurality of nozzles 14, a mold cavity plate 16, a plurality of valve pins 30 and a plurality of valve pin actuating mechanisms 32. Manifold 12 has a mold machine inlet 18, which leads to a plurality of manifold melt passages 20. A heater 26 is included in manifold 12 to heat melt in manifold melt passages 20. Each nozzle 14 includes a nozzle body 21 and a heater 28. Nozzle body 21 defines a nozzle melt passage 25, which has an inlet 27 that is downstream from one of the melt passages 20. Heater 28 is used to heat the flow of melt through nozzle 14. The mold cavity plate 16 defines a plurality of mold cavities 24 that are downstream from the nozzle melt passages 25. The junction between a nozzle melt passage 25 and a mold cavity 24 is referred to as a gate 22. It will be appreciated that the melt passage configuration shown in the Figures is exemplary and that other melt passage configurations are permissible within the scope of the invention.

Valve pins 30 extend into a portion of the nozzle melt passages 25 and are moveable therein along a line of travel parallel to that portion of the nozzle melt passages 25, by valve pin actuating mechanisms 32, to control the flow of melt into the mold cavities 24. The valve pins 30 may be generally pin shaped, as shown, or alternatively they may have any suitable shape for controlling the flow of melt into the mold cavities 24.

Figure 2:
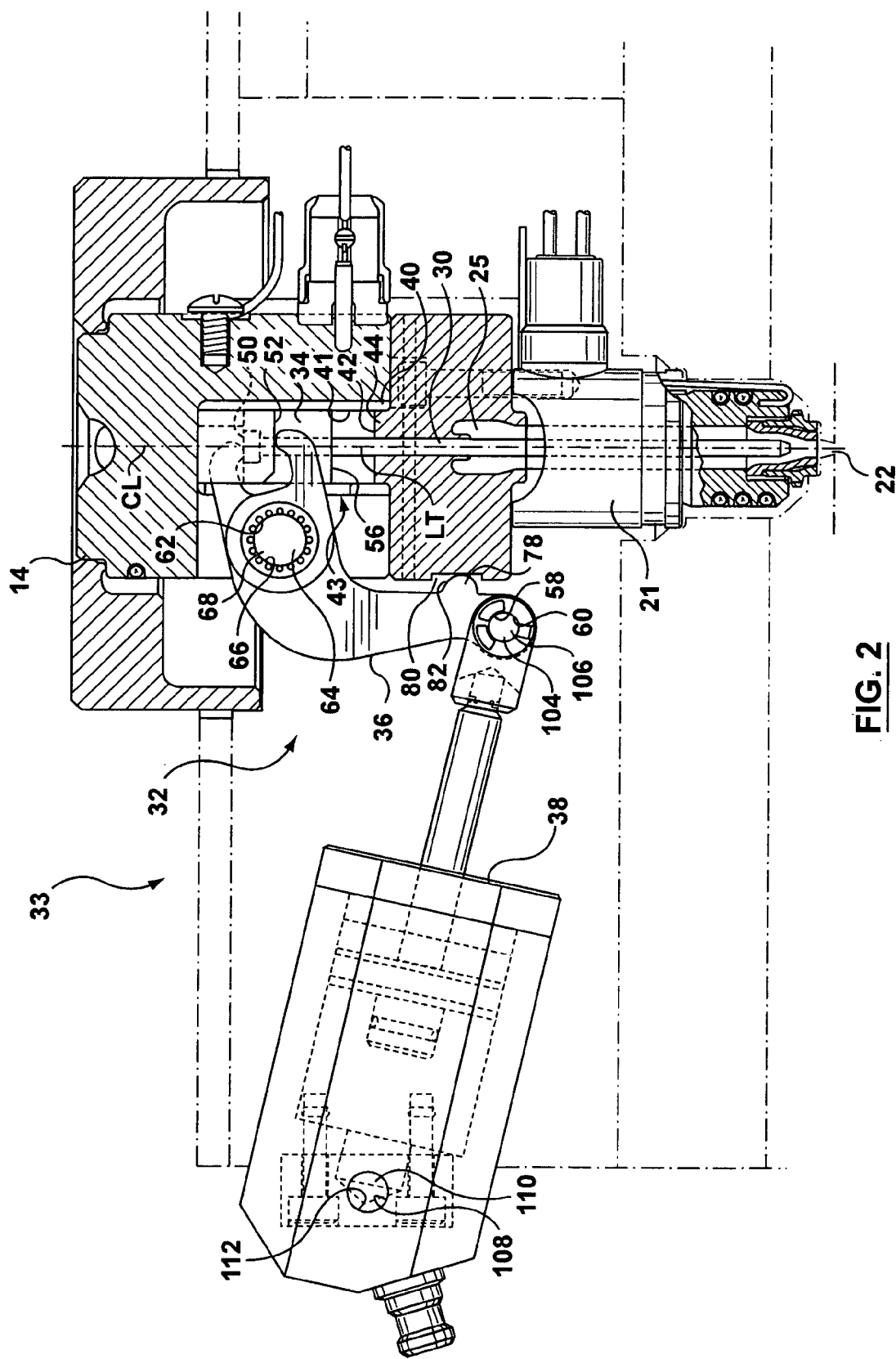
FIG. 2 is an elevation view of a portion of the injection molding apparatus of FIG. 1, showing the valve pin actuating mechanism and a valve pin in an 'open' position.

Reference is made to FIG. 2, which shows a nozzle system 33, which includes one of the nozzles 14, one of the valve pins 30 and one of the valve pin actuating mechanisms 32. The actuating mechanism 32 includes a valve pin guiding element 34, a linkage element 36 and a actuator 38. The valve pin actuating mechanism 32 can be used to access the valve pin 30 generally laterally, and move the valve pin 30 through a range of positions, or between any suitable first and second positions. For example, for the embodiment as shown, where the valve pin is positioned near the gate 22, the valve pin actuating mechanism 32 can be used to move the valve pin 30 between an 'open' (first) position (as shown in FIG. 2), wherein melt flow is permitted to enter the mold cavity 24, and a 'closed' (second) position, wherein the melt flow is prevented from entering the mold cavity 24 (see FIG. 3). Alternatively, the actuating mechanism 32 can be used to move the valve pin 30 to a second position to permit less flow through a nozzle melt passage 25, than in the first position. Alternatively, the actuating mechanism 32 can be used to move a valve pin 30 between first and second positions in other portions of an injection molding apparatus, such as, for example, in sprue mechanisms between manifold plates in a stack-mold.

The valve pin guiding element 34 supports and guides the valve pin 30. A sleeve 40 defines a guiding element channel 41 in which the valve pin guiding element channel 34 slides. The valve pin guiding element 34 slides in the guiding element channel 41 along a line of travel LT so that the valve pin 30 moves in the nozzle melt passage 25 between the first and second positions. Sleeve 40 has an aperture 43 therethrough permitting the linkage element 36 to connect to the guiding element 34.

A limit surface 42 is positioned to limit the travel of the guiding element 34 towards the gate 22. The limit surface 42 may be a surface on any suitable component of the injection molding apparatus 10. For example, the limit surface may be on a valve bushing 44.

Figure 4:
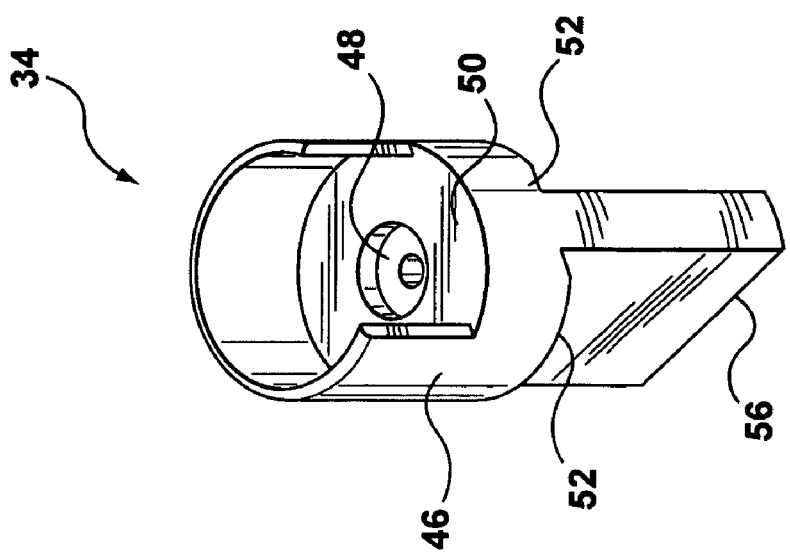
FIG. 4 is a perspective view of a valve pin guiding element shown FIG. 2.

Reference is now made to FIG. 4. Guiding element 34 has a sliding surface 46 for sliding within channel 41. Sliding surface 46 is preferably generally cylindrical, as shown. Alternatively, however, sliding surface 46 may be square-shaped, rectangle-shaped, or may have any other shape suitable for permitting sliding.

Guiding element 34 has a receiving bore 48, which is shouldered, for receiving valve pin 30. The guiding element 34 includes a first, outer, receiving surface 50, and two second, outer, receiving surfaces 52. The first and second receiving surfaces 50 and 52, receive the linkage element 36. The first and second receiving surfaces 50 and 52 are preferably planar, and perpendicular (see FIGS. 2 and 3) to the line of travel LT of the guiding element 34 in the channel 41. Alternatively, one of receiving surfaces 50 and 52, (ie. either receiving surface 50 or both of receiving surfaces 52), is planar and substantially perpendicular to the line of travel LT of the guiding element 34 in the channel 41 (FIGS. 2 and 3), and the other of the surfaces 50 or 52 is at least angled suitably for engagement by the linkage element 36 and movement of the guiding element 34 along the line of travel LT.

Any suitable holding and guiding means for valve pin 30 can alternatively be used, instead of the guiding element 34. For example, guiding element 34 can be integrally joined to valve pin 30.

The valve pin guiding element 34 has a shoulder 56 that cooperates with the limit surface 42 (FIG. 3) to limit the travel of the guiding element 34, and the valve pin 30 in moving towards the gate 22. By limiting the travel of the guiding element 34, there is a reduced risk of damage to the gate 22 or the valve pin 30 from impact by the valve pin 30 in the gate 22 during closure of the gate 22.

Referring to FIG. 2, the linkage element 36 connects the actuator 38 to the valve pin guiding element 34. The linkage element 36 includes a first connector 58, which rotatably connects linkage element 36 to actuator 38. The first connector 58 may be, for example, a bore 60. Alternatively, the first connector 58 may be any suitable connection means for providing a rotatable connection between linkage element 36 and actuator 38. The first connector 58 is an upstream connector.

Figure 3:
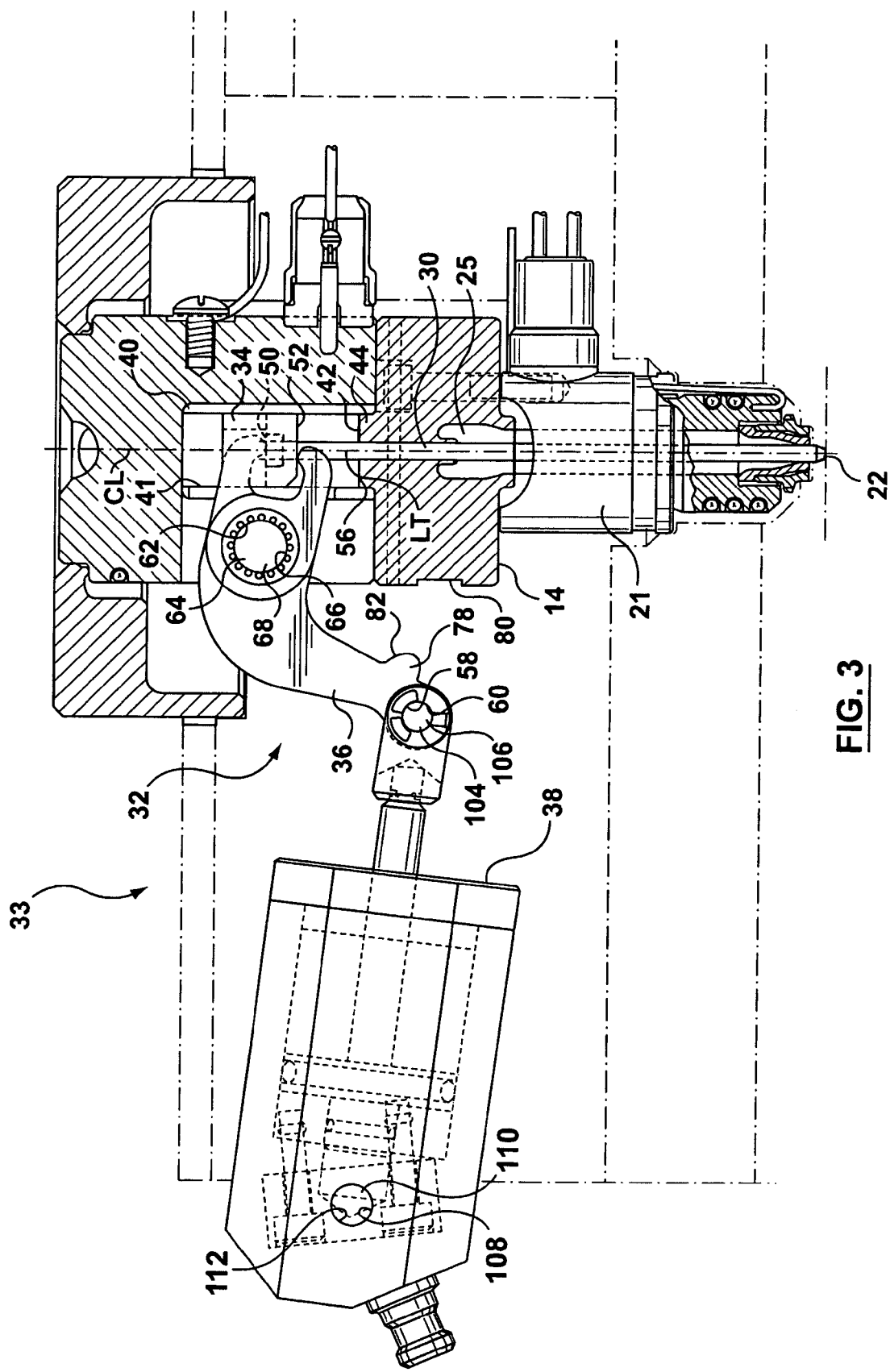
FIG. 3 is an elevation view of a portion of the injection molding apparatus of FIG. 1, showing the valve pin actuating mechanism and a valve pin in a 'closed' position.

The linkage element 36 includes a second connector 62, which pivotally connects linkage element 36 to a portion 64 on the injection molding apparatus 10 (see FIGS. 2 and 3). The second connector 62 and portion 64 may be any suitable pivotal connection means, such as, for example, a bore 66 and a shaft 68.

Figure 5:
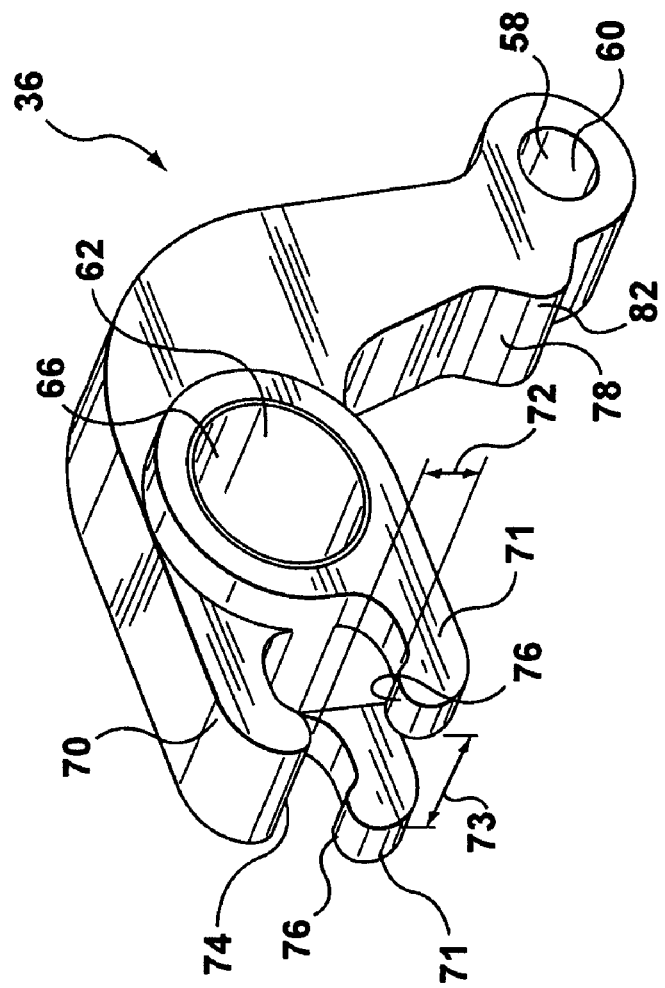
FIG. 5 is a perspective view of a linkage element shown in FIG. 2.
Figure 6A:
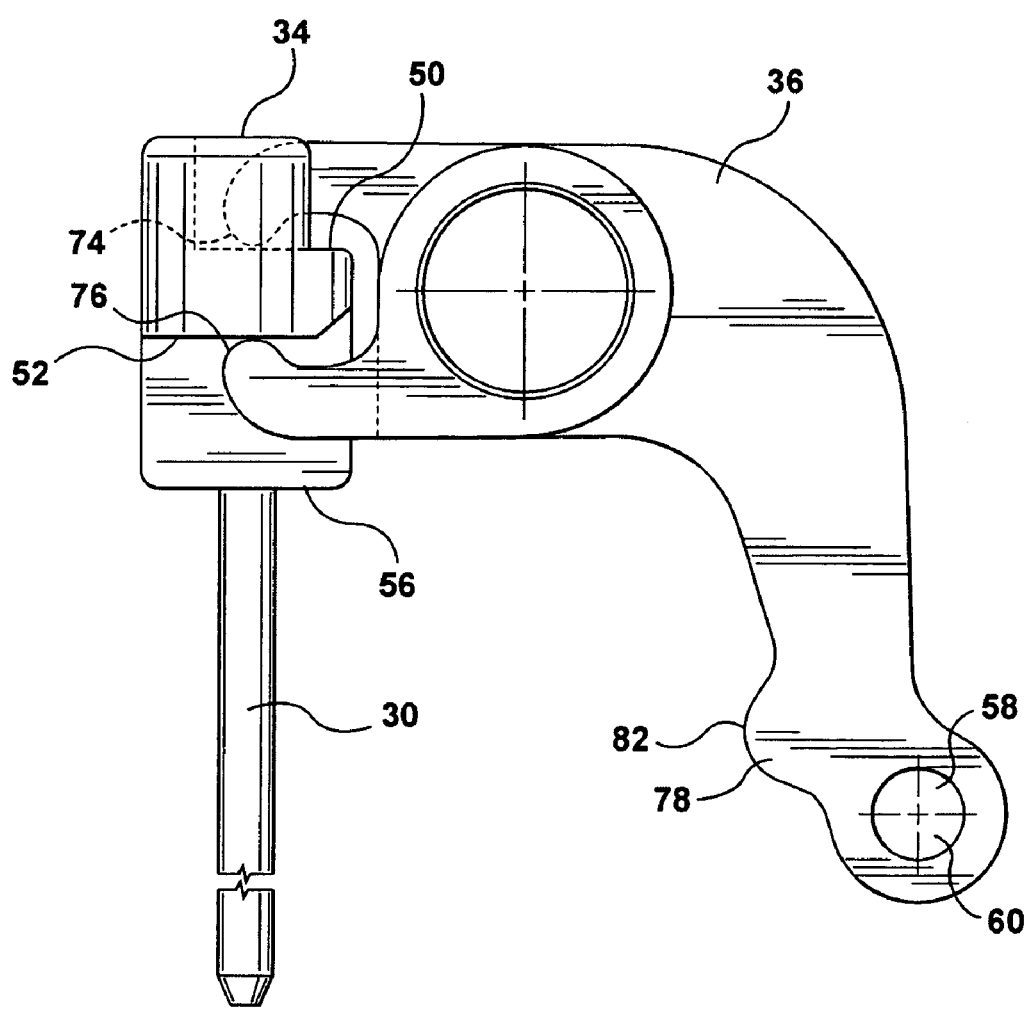
FIGS. 6a and 6b are side views of the linkage element shown in FIG. 5, engaging the guiding element shown in FIG. 4.
Figure 6B:
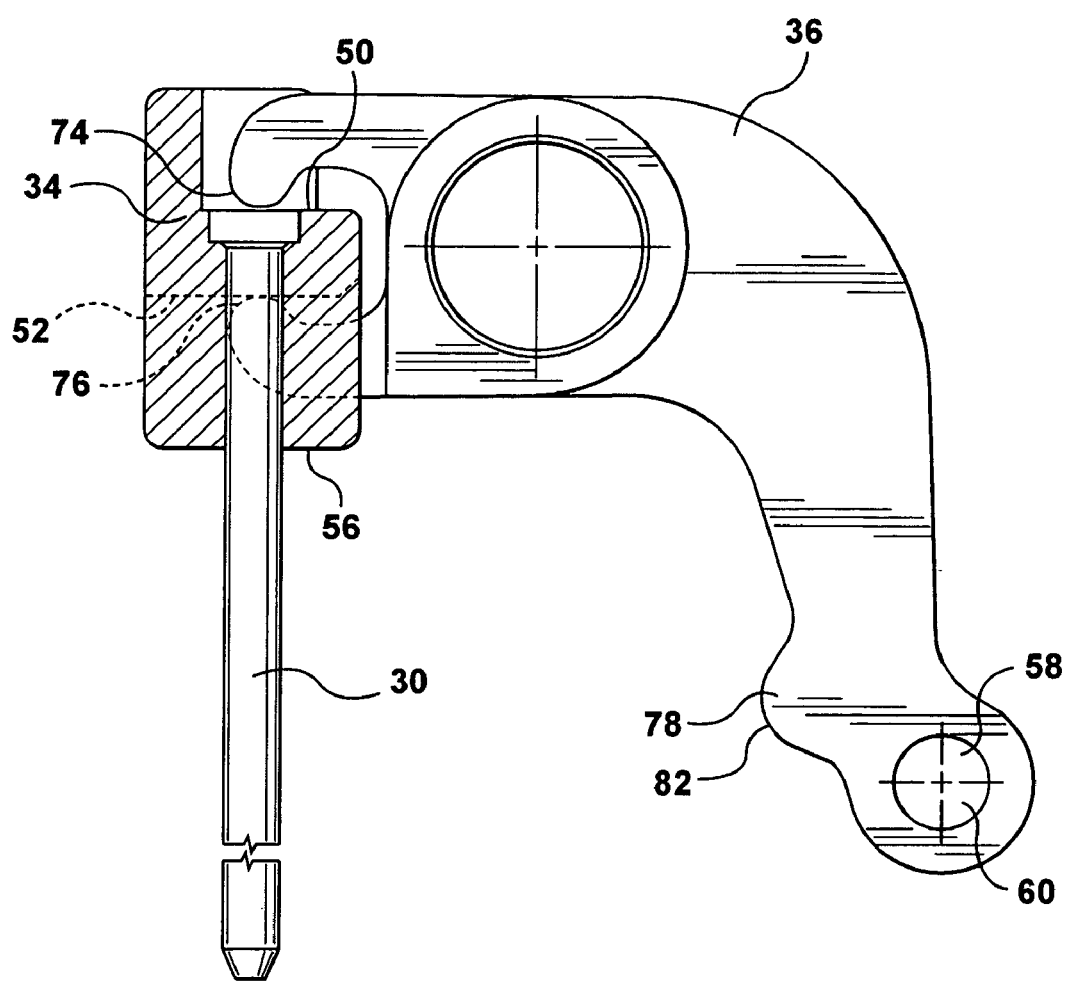

Reference is made to FIG. 5. The linkage element 36 has a first arm 70 and two second arms 71 for engaging the valve pin guiding element 34 (FIG. 6). The first and second arms 70 and 71 constitute a downstream connector on the linkage element. The first and second arms 70 and 71 define a gap 72 therebetween. The second arms 71 define a second gap 73 permitting valve pin 30 and the shoulder portion 56 to extend therethrough. The first arm 70 and the second arms 71 have opposing, inwardly facing engagement surfaces 74 and 76 respectively. Referring to FIGS. 6a and 6b, the engagement surface 74 engages receiving surface 50 for movement of the valve pin 30, in one direction (eg. towards the 'closed' position). The engagement surfaces 76 engage the second receiving surfaces 52 for movement of the valve pin 30 in the opposite direction, (eg. towards the 'open' position). Preferably, as shown, both of the engagement surfaces 74 and 76 are arcuate, which is explained in more detail below. Alternatively, one of the engagement surfaces 74 and 76 (ie. either surface 74, or both surfaces 76) may be arcuate. As another alternative, the engagement surfaces 74 and 76 may have any suitable shape for engaging surfaces 50 and 52 for moving guiding element 34.

Gap 72 permits arm 70 to engage guiding element 34 at or near a selected location, such as, for example, at or near the centerline CL of the guiding element 34. Similarly, gaps 72 and 73 together permit second arms 71 to engage the guiding element 34 at or near a selected point.

The linkage element 36 further includes a stop 78 that may be integrally formed into the linkage element 36. A limit surface 80 that is adapted to cooperate with the stop 78 may be positioned on any suitable component of the injection molding apparatus 10. The stop 78 and limit surface 80 cooperate to limit the rotational travel of the linkage element 36 during movement of the valve pin 30 away from the gate 22 (FIG. 2). The stop 78 and limit surface 80 engage each other mechanically upstream of the downstream connector which contains the arms 70 and 71.

By engaging the stop 78 and the limit surface 80 mechanically upstream of the arms 70 and 71, to limit the angle of rotation of the linkage element 36, reduces the stresses on the arms 71, relative to a structure where stopping the movement of the valve pin 30 occurs at or mechanically downstream from the connection of the arms 70 and 71 with the guiding element 34.

The location of the stop 78 and the location of its engagement with the limit surface 80 limits forces from the actuator 38 from being transferred to the arms 71, when engagement between the stop 78 and the limit surface 80 occurs.

The stop 78 has an engagement surface 82 that engages the limit surface 80 for stopping the rotation of the linkage element 36 at a selected angle. One of the surfaces 82 and 80 may be arcuate in a plane that is at least parallel to the plane of rotation of the linkage element 36. In other words, the arcuate surface may be arcuate in a plane that is parallel to the plane of rotation of the linkage element 36, or may alternatively be arcuate in the same plane that is the plane of rotation of the linkage element 36. For example, in the embodiment shown in FIGS. 6a and 6b, the arcuate surface is surface 82 on the stop 78.

Whichever of the surfaces 82 and 80 is the arcuate surface may be made non-arcuate in a direction that is perpendicular to the selected plane, as is the case with surface 82 shown in FIGS. 6a and 6b. Furthermore, the other of the surfaces 82 and 80 may be made planar, as is the case with the limit surface 80 in FIGS. 2 and 3.

In this way, the engagement between the engagement surface 82 and the limit surface 80 is always a line contact regardless of the relative angle between the surfaces 82 and 80 when they meet, during use of the actuating system. Furthermore, the arcuate surface and the flat surface engage without risk of one of the surfaces gouging and potentially damaging the other surface. By contrast, if one surface was, for example, a part-spherical surface and the other surface was flat, then the contact between them would be a point contact, though such an arrangement would still avoid gouging. While the description above points out some particular preferred configurations, it is within the scope of this invention to have the surfaces 82 and 80 to be any kind of contact, including for example, a point contact, a line contact or a plane contact.

The limit surface 80 may be positioned on any suitable component of the injection molding apparatus 10, such as on the side of the valve bushing 44. The limit surface 80 may be, for example, a flat surface that is machined from the side of the valve bushing 44. Alternatively, the limit surface 80 may simply be the side of the valve bushing 44 and may be other than flat.

The stop 78 may advantageously be positioned proximate the connector 58, so that when the actuator 38 moves the linkage element 36 to one end of its travel and the stop 78 and the limit surface 80 engage each other to prevent further travel of the linkage element 36, the bending stress on the linkage element 36 caused by the actuator 38 is reduced, relative to a configuration where the stop 78 is positioned far away from the connector 58.

Figure 9:
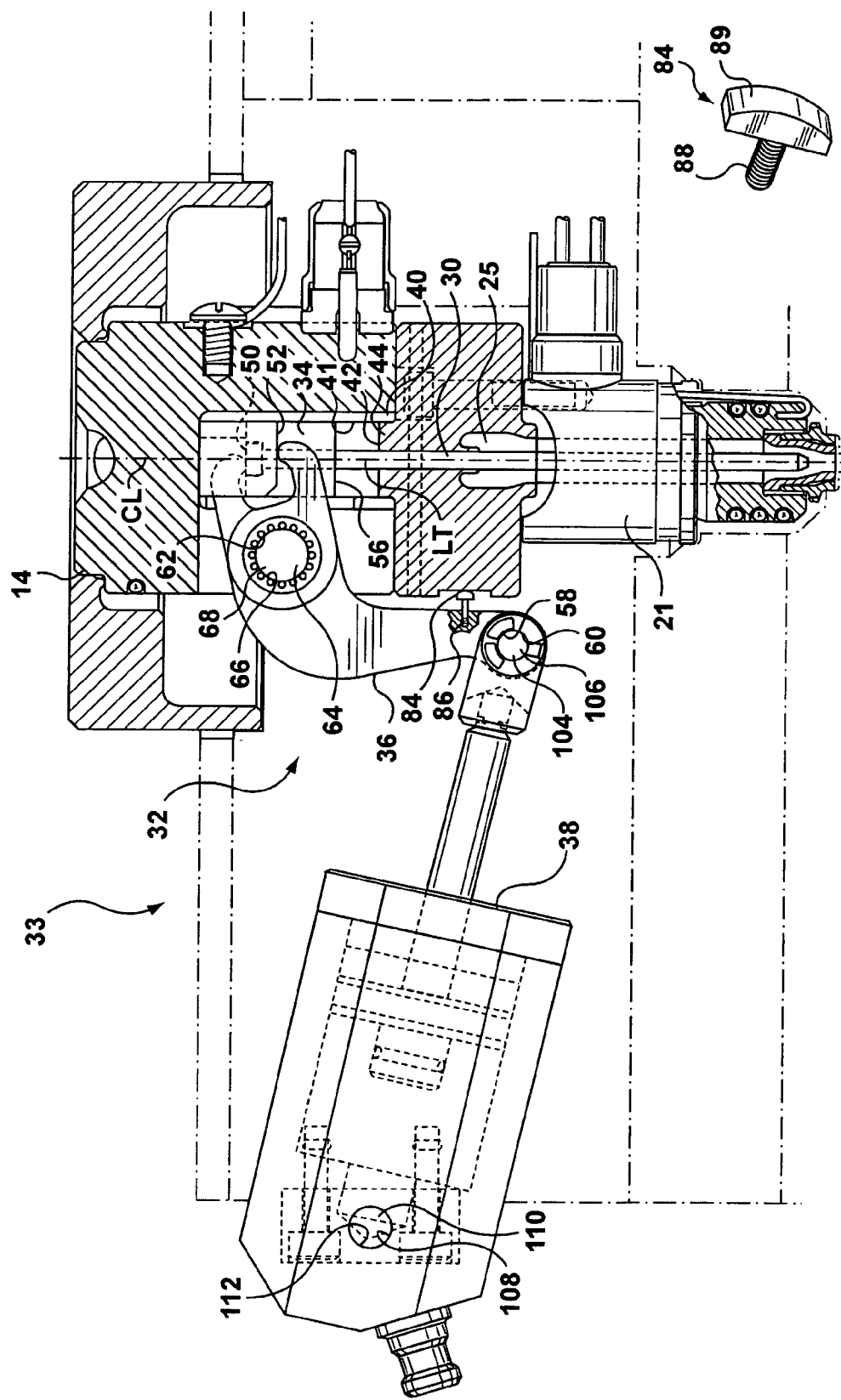

Reference is made to FIG. 9, which shows a stop 84, which can alternatively be used with the linkage element 36 instead of the stop 78. The stop 84 may be mounted in an aperture 86 in the linkage element 36, as shown in FIG. 9. The stop 84 cooperates with the limit surface 80 to limit the rotational travel of the linkage element 36 in a similar manner to the stop 78. Referring to FIG. 9a, the stop 84 may have a mounting portion 88, which mounts in the aperture 86. The mounting portion 88 and the aperture 86 may be threaded so that the distance that the stop 84 extends outwards from the linkage element 36 may be adjusted as desired. By providing adjustment to the stop 84, the position of the valve pin 30 in the 'open' position can be more easily selected.

The stop 84 has an engagement surface 89, which contacts the limit surface 80 when the linkage element 36 is rotated to the selected angle. The engagement surface 89 may be arcuate in a plane that is at least parallel to the plane of rotation of the linkage element 36. It is further possible for the engagement surface 89 to be domed, such as for example, part-spherical, so that, regardless of the degree of rotation of the stop 84 in the threaded aperture 86, the engagement surface 89 is always arcuate in a plane that is at least parallel to the plane of rotation of the linkage element 36.

Figure 10:
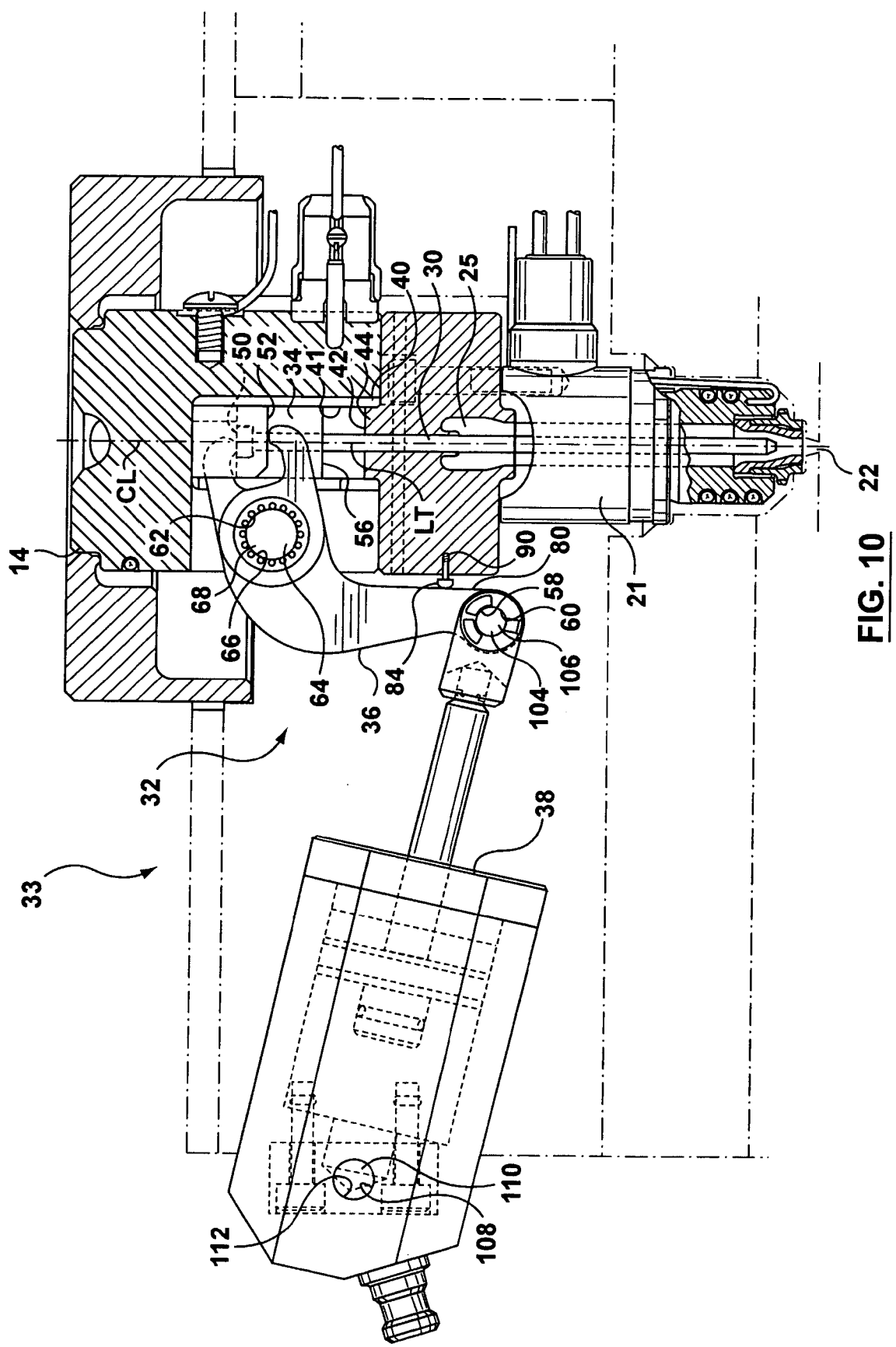
FIG. 10 is a side view of the valve pin actuating mechanism shown in FIG. 2, having another alternative stop to that shown in FIG. 2.

Reference is made to FIG. 10, which shows the stop 84 mounted in an aperture 90 in the valve bushing 44. In this configuration, the limit surface 80 is on the linkage element 36. The operation of the stop 84 when mounted in the valve bushing 44 is similar to that of the stop 84 when it is mounted in the linkage element 36.

Reference is made to FIG. 2. The actuator 38 may be any type of actuator, such as a pneumatic or hydraulic cylinder, or alternatively an electrical actuator. As shown, the actuator may be, for example, a linear, hydraulic actuator. Actuator 38 includes a connector 104 for rotatably connecting actuator 38 to the connector 58 on the linkage element 36. The connector 104 may be any suitable type of connector, such as, for example, a pin 106, which is received in the aperture 60.

The actuator 38 mounts to the injection molding apparatus 10 by another connector 108 which permits rotation of the actuator 38 thereabout. The connector 108 may be any suitable type of connector, such as for example a pin 110 for mounting in a cylindrical aperture 112 on the injection molding apparatus 10.

During the cavity-filling portion of an injection cycle, the valve pin 30 is in the 'open' position (FIG. 2). Melt flows from a melt source (not shown) through the inlet 18, through melt passages 20 and 25, through gates 22 and into the mold cavities 24. Once this is completed, the melt flow to the cavities 24 is shut off. To shut off the melt flow to the gates 22, the actuator is retracted, causing the rotation of the linkage element 36. The first engagement surface 74 engages the first receiving surface 50, moving the valve pin guiding element 34 and valve pin 30 towards the 'closed' position (FIG. 3). As shown in FIG. 3, the movement of the valve pin 30 is stopped when the shoulder 56 on the valve pin guiding element 34 contacts the limit surface 42.

Figure 7:
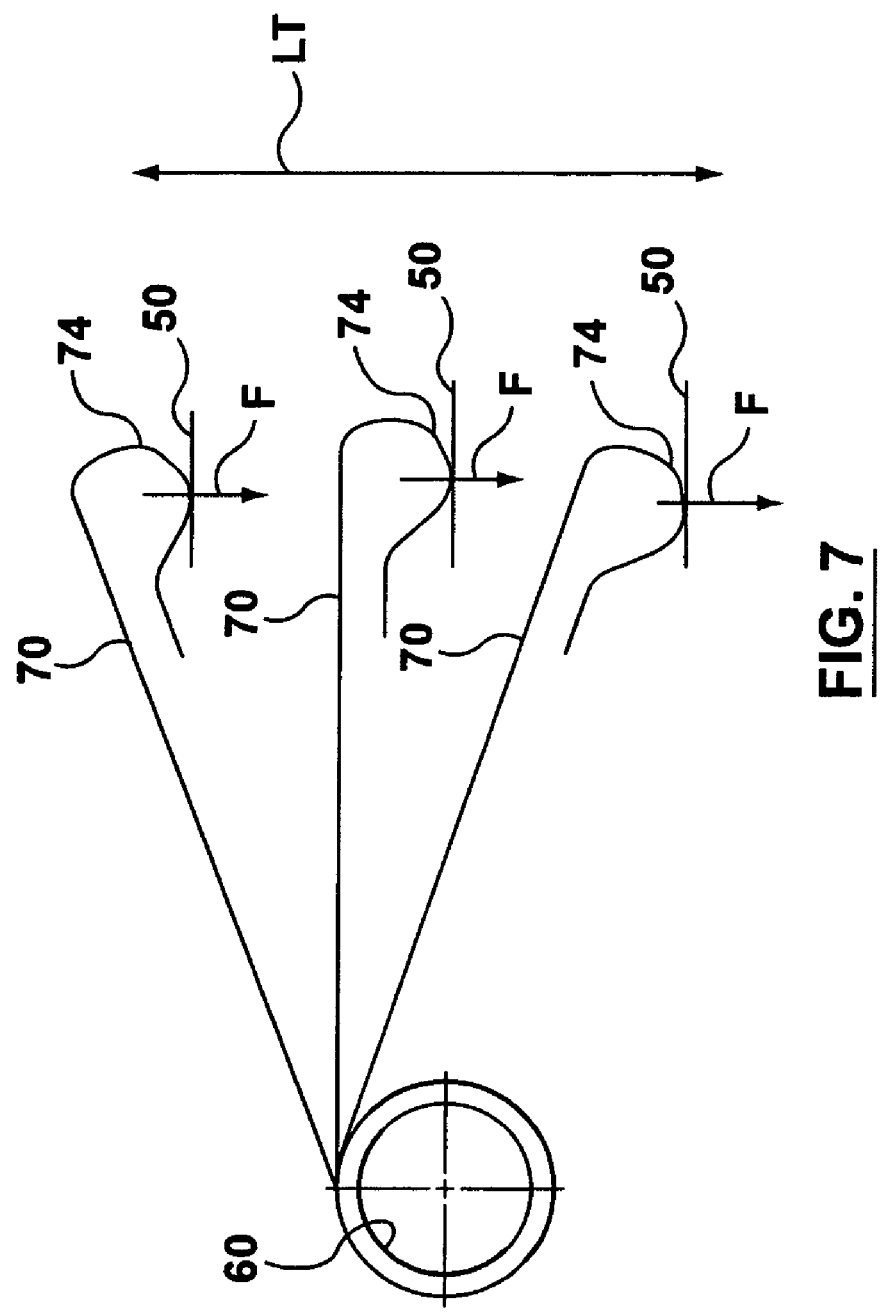
FIG. 7 is a view of the travel path of a portion of the linkage element shown in FIG. 5 and a portion of the guiding element shown in FIG. 4.

Reference is made to FIG. 7, which shows the path followed by the arm 70 during the travel of the valve pin 30 between the 'open' and 'closed' positions. The direction of a force, (excluding frictional forces), transmitted between the first engagement surface 74 and the receiving surface 50, is shown by the line F. Regardless of the shape of the engagement surface 74, the line of force F remains perpendicular to the receiving surface 50, throughout the range of motion of the guiding element 34, ignoring friction. If the receiving surface 50 is perpendicular to the line of travel LT of the valve pin guiding element 34 and the valve pin 30, as shown in FIGS. 2 and 3, the line of force F is parallel to the line of travel LT of the valve pin guiding element 34 and the valve pin 30, throughout the range of travel of the guiding element 34 and the valve pin 30. Thus, lateral forces on the guiding element 34 are reduced.

Lateral forces, however, will exist due to frictional forces between the engagement surface 74 and the receiving surface 50 during closing of the gate 22. Because the lateral forces are exerted directly on the guiding element 34, and not on the valve pin 30, stresses, such as bending stresses on the valve pin 30 are reduced. Furthermore, the guiding element 34 may, for example, have a larger bearing area, (which is sliding surface 46), as compared to the valve pin 30, and thus can be subject to reduced stresses from any lateral forces created between surfaces 74 and 50.

By making the engagement surfaces 74 and 76 arcuate, there will be a reduced tendency for the engagement surfaces 74 and 76 to 'dig' into and damage the receiving surfaces 50 and 52 during movement of the valve pin 30.

Reference is made to FIG. 2. The operation of the actuating mechanism to move the valve pin to the 'open' position is similar to the operation of the actuating mechanism 32 to move the valve pin 30 into the 'closed' position. The actuator 38 extends, thereby rotating linkage element 36 about shaft 68 in the opposite direction to that for closing the gate 22. Engagement surfaces 76 engage receiving surfaces 52, to move the valve pin guiding element 34 and the valve pin 30 away from gate 22. The path of the arms 71 and the guiding element 34 to open gate 22, is similar, but opposite, to that of the arm 70 and the guiding element 34 to close the gate 22. The movement of the valve pin 30 is stopped when the stop 78 or 84 engages the limit surface 80, and stops the rotation of the linkage element 36.

Referring to FIG. 7, the discussion above regarding the forces exerted during the movement of the valve pin 30 towards the 'closed' position also apply to the forces exerted between the engagement surfaces 76 and the receiving surfaces 52, during the movement of the valve pin 30 towards the 'open' position.

The operation of the actuating mechanism 32 can be described as follows. Actuator 38 initiates motion of the end of the linkage element 36 having the connector 58, which in turn causes linkage element 36 to rotate about the connector 62, which in turn causes the arms 70 or 71 to engage the valve pin guiding element 34. In this sense, the actuator 38 is mechanically upstream from the connector 58 of the linkage element, which is in turn, upstream from the connector 62, which is in turn upstream from the arms 71. The stop 78 or 84 may engage the limit surface 80 anywhere that is mechanically upstream from the arms 71. In doing so, stresses on the arms 71 are reduced, since there are relatively lower forces acting on the arms 71, than if the stop 78 or 84 engaged the limit surface 80 mechanically downstream from the arms 71.

Linkage element 36 has been described to include a single first arm, and two second arms, and guiding element 34 to include a single first receiving surface and two second receiving surfaces. Alternatively, however, the guiding element 34 may be configured in such a way that a single second arm may be used. For example, the guiding element may include a disc spaced above a valve pin holding portion, so that the linkage element engages the two surfaces of the disc. In this case, a single, centred second arm can be included on the linkage element, rather than two second arms.

In an embodiment where the engagement surfaces on the arms 70 and 71 of the linkage element 36 are arcuate, the receiving surfaces 50 and 52 on the guide element 34 may have any suitable shape for receiving the engagement surfaces 74 and 76.

In an embodiment wherein the receiving surfaces on the guiding element are not substantially perpendicular to the line of travel LT, the engagement surfaces on the arms of the linkage element may have any suitable shape for engaging the receiving surfaces.

Figure 8:
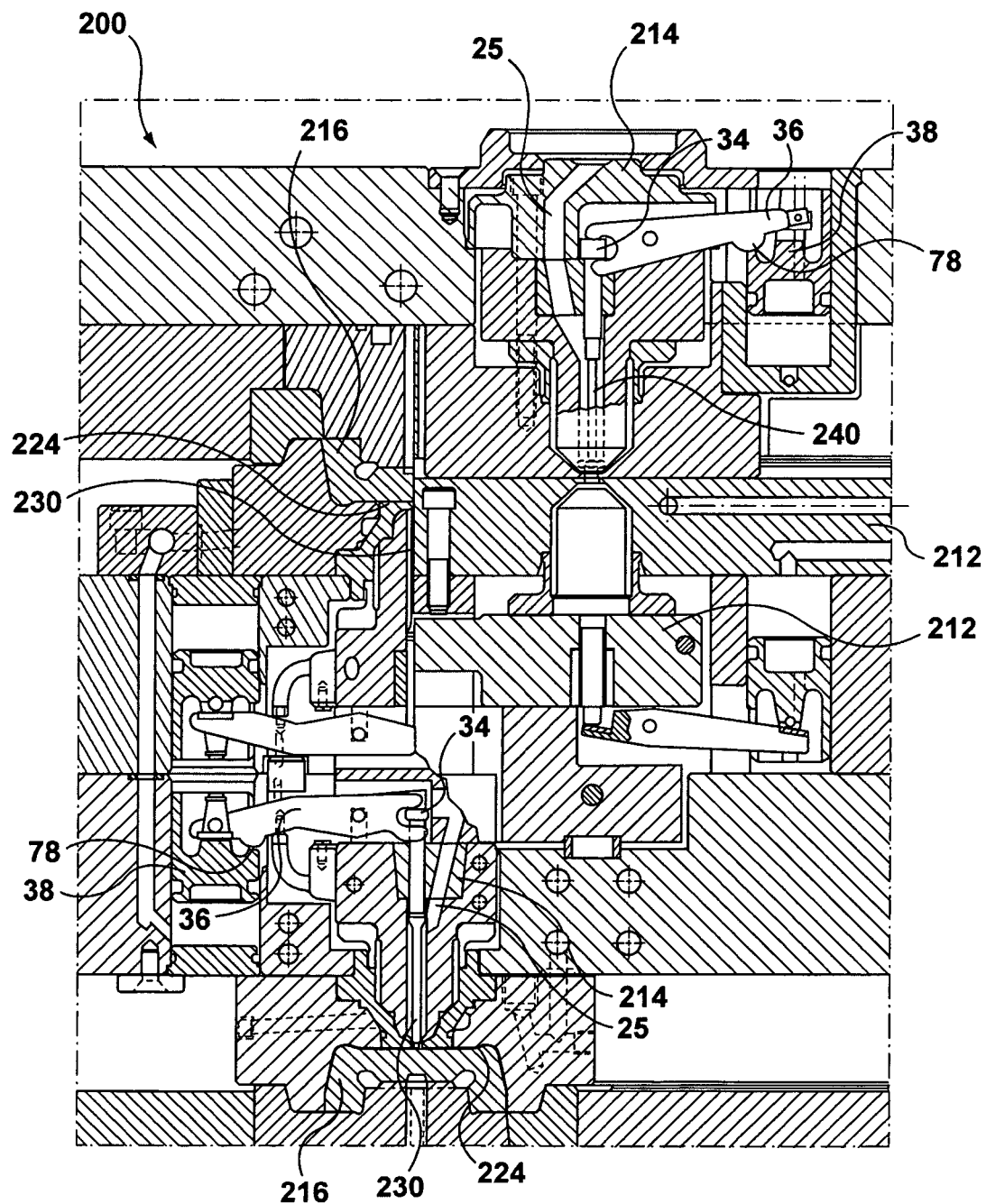
FIG. 8 is a sectional view of an injection molding apparatus having a stack mold, having a plurality of the valve pin actuating mechanisms shown in FIG. 2.

Reference is now made to FIG. 8, which shows an injection molding apparatus 200 having a stack mold, having a plurality of nozzle assemblies 33 and valve pin actuating mechanisms 32 in accordance with the present invention. Molding machine 200 is similar to the stack mold molding machine disclosed in U.S. Pat. No. 4,212,626, hereby incorporated by reference, except that the valve pin actuating mechanisms on the machine disclosed in that patent are replaced by valve pin actuating mechanisms 32. Molding machine 200 includes a plurality of manifold plates 212 which transfer melt from a melt source (not shown) to a plurality of mold cavity plates 216. Nozzle systems 33 including nozzles 214, valve pins 230 and valve pin actuating mechanisms 32 are used. Valve pin actuating mechanisms 32 are used to control valve pins 240 in melt transfer mechanisms to control melt flow between manifold plates 212. As well, actuating mechanisms are used to control valve pins 230 to control melt flow into mold cavities 224 in mold cavity plates 216.

While a particular embodiment of a valve pin actuating mechanism has been described incorporating the stops 78 and 84 and the limit surface 80, the stops 78 and 84 and the limit surface can be used with other valve pin actuating mechanism described in the patent literature, such as any of the mechanism disclosed in U.S. Pat. No. 5,948,450 (Swenson et. al.), U.S. Pat. No. 3,488,810 (Gellert) and U.S. Pat. No. 4,712,995 (Basnett) which are all hereby incorporated by reference.

The stops 78 and 84 and the limit surface 80 have been described as being associated with the linkage element 36. It is alternatively possible for the stops 78 and 84 and the limit surface 80 to be built into the actuator 38, so as to limit the stroke of the actuator 38. For example, the stop may comprise a pin that extends into the body of the actuator 38 and engages a face on a piston inside the body of the actuator 38 to limit the stroke of the piston.

As a further alternative, the stops 78 and 84 and the limit surface 80 may be positioned to limit the travel of the linkage element 36 in the direction towards the 'closed' position of the valve pin 30, instead of relying on the shoulder 56 and the limit surface 42 on the guiding element 34 and the valve bushing 44 respectively. A stop 78 or 84 and a limit surface 80 may be positioned to limited the travel of the linkage element 36 in both directions (ie. towards both the 'open' and 'closed' positions of the valve pin 30).

It is optionally possible for the linkage element 36 to be configured to directly engage the valve pin 30, instead of engaging the guiding element 34. The linkage element 36 may alternatively be replaced by any suitable linkage system, having one or more components operatively connecting the actuator 38 to the valve pin 34.

While the above description constitutes the preferred embodiment, it will be appreciated that the present invention is susceptible to modification and change without departing from the fair meaning of the accompanying claims.

The invention claimed is:

1. A valve pin actuating mechanism for an injection molding apparatus comprising:
   an actuator;
   a linkage element rotatably connected to the injection molding apparatus and being rotatable in a plane of rotation by actuation of the actuator, the linkage element having a first end and a second end, wherein the linkage element is rotatably connected to the actuator at the first end and rotatably connected to the valve pin at the second end; and a stop that is integral with the linkage element, the stop extending from a surface of the linkage element to form a bump, the bump defining an engagement surface, wherein the linkage element is rotatable between a first position and a second position, wherein the engagement surface contacts a limit surface disposed on a component of the injection molding apparatus in the first position, and the engagement surface is spaced from the limit surface in the second position.

2. The valve pin actuating mechanism of claim 1, wherein the limit surface is disposed on a valve bushing.

3. The valve pin actuating mechanism of claim 1, wherein the stop is disposed adjacent to the first end of the linkage element.

4. The valve pin actuating mechanism of claim 1, wherein the stop is disposed adjacent to the second end of the linkage element.

5. The valve pin actuating mechanism of claim 1, wherein the engagement surface is domed.

6. The valve pin actuating mechanism of claim 1, wherein the limit surface is domed.

7. The valve pin actuating mechanism of claim 1, wherein the engagement surface is arcuate in a plane that is parallel to the plane of rotation.

8. The valve pin actuating mechanism of claim 1, wherein the limit surface is arcuate in a plane parallel to the plane of rotation.

9. A valve pin actuating mechanism for an injection molding apparatus comprising:

an actuator;

a linkage element rotatably connected to the injection molding apparatus and being rotatable in a plane of rotation by actuation of the actuator, the linkage element having a first end and a second end, wherein the linkage element is rotatably connected to the actuator at the first end and rotatably connected to the valve pin at the second end; and a stop extending from a valve bushing of the injection molding apparatus, the stop having an end facing away from the valve bushing that defines an engagement surface, wherein the linkage element is rotatable between a first position and a second position, wherein the engagement surface contacts a limit surface disposed on the linkage element in the first position in which the valve pin is in an open position, and the engagement surface is spaced from the limit surface in the second position in which the valve pin is in a closed position.

10. The valve pin actuating mechanism of claim 9, wherein the stop is integral with the valve bushing and extends from a surface of the valve bushing to form a bump, the bump defining the engagement surface.

11. The valve pin actuating mechanism of claim 9, wherein the stop is separate from the valve bushing and coupled thereto, the stop having an end that extends from a surface of the valve bushing and defines the engagement surface.

12. The valve pin actuating mechanism of claim 11, wherein the position of the stop is adjustable between a first stop position and a second stop position, wherein the angle of rotation of the linkage element is larger when the stop is in the first stop position than when the stop is in the second stop position.

13. The valve pin actuating mechanism of claim 12, wherein the stop is threaded and is received in a threaded aperture in the valve bushing.

14. The valve pin actuating mechanism of claim 9, wherein the engagement surface is domed.

15. The valve pin actuating mechanism of claim 9, wherein the limit surface is domed.

16. The valve pin actuating mechanism of claim 9, wherein the engagement surface is arcuate in a plane that is parallel to the plane of rotation.

17. The valve pin actuating mechanism of claim 9, wherein the limit surface is arcuate in a plane parallel to the plane of rotation.

18. A valve pin actuating mechanism for an injection molding apparatus comprising:

an actuator;

a linkage element rotatably connected to the injection molding apparatus and being rotatable in a plane of rotation by actuation of the actuator, the linkage element having a first end and a second end, wherein the linkage element is rotatably connected to the actuator at the first end and rotatably connected to the valve pin at the second end; and a stop that is separate from the linkage element and coupled thereto, the stop extending from a surface of the linkage element and having an end facing away from the linkage element that defines an engagement surface, wherein the linkage element is rotatable between a first position and a second position, wherein the engagement surface of the stop contacts a limit surface disposed on a component of the injection molding apparatus in the first position, and the engagement surface is spaced from the limit surface in the second position.

19. The valve pin actuating mechanism of claim 18, wherein the limit surface is disposed on a valve bushing.

20. The valve pin actuating mechanism of claim 18, wherein the stop is adjustably coupled to the linkage element between a first stop position and a second stop position, wherein the distance between the engagement surface and the linkage element is larger in the first stop position than in the second stop position.

21. The valve pin actuating mechanism of claim 20, wherein a portion of the stop is threaded and is received in a threaded aperture disposed in the linkage element.

22. The valve pin actuating mechanism of claim 18, wherein the stop is disposed adjacent to the first end of the linkage element.

23. The valve pin actuating mechanism of claim 18, wherein the stop is disposed adjacent to the second end of the linkage element.

24. The valve pin actuating mechanism of claim 18, wherein the engagement surface is domed.

25. The valve pin actuating mechanism of claim 18, wherein the limit surface is domed.

26. The valve pin actuating mechanism of claim 18, wherein the engagement surface is arcuate in a plane that is parallel to the plane of rotation.

27. The valve pin actuating mechanism of claim 18, wherein the limit surface is arcuate in a plane parallel to the plane of rotation.

* * * * *